(12) United States Patent
Giehl

(10) Patent No.: US 11,833,957 B2
(45) Date of Patent: Dec. 5, 2023

(54) LIGHTING DEVICE FOR A VEHICLE, AND METHOD FOR PRODUCING A LIGHTING DEVICE FOR A VEHICLE

(71) Applicant: HELLA GmbH & Co. KGaA, Lippstadt (DE)

(72) Inventor: Markus Giehl, Jena (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 97 days.

(21) Appl. No.: 17/520,351

(22) Filed: Nov. 5, 2021

(65) Prior Publication Data
US 2022/0055524 A1    Feb. 24, 2022

Related U.S. Application Data

(63) Continuation of application No. PCT/EP2020/061120, filed on Apr. 22, 2020.

(30) Foreign Application Priority Data

May 6, 2019    (DE) ...................... 10 2019 111 647.3

(51) Int. Cl.
*B60Q 1/02*    (2006.01)
*F21S 43/20*    (2018.01)
*G02B 5/18*    (2006.01)
*G03H 1/08*    (2006.01)

(52) U.S. Cl.
CPC ............. *B60Q 1/02* (2013.01); *F21S 43/26* (2018.01); *G02B 5/1876* (2013.01); *G03H 1/0891* (2013.01)

(58) Field of Classification Search
CPC .................................. B60Q 1/02; G03H 1/265
See application file for complete search history.

(56) References Cited

U.S. PATENT DOCUMENTS

| 4,455,061 A | 6/1984 | Case |
| 5,289,298 A | 2/1994 | Smith |
| 10,576,874 B2 | 3/2020 | Kurashige et al. |

(Continued)

FOREIGN PATENT DOCUMENTS

| CA | 2593340 A1 * | 1/2008 | ............... B41M 1/10 |
| DE | 102014117883 A1 | 6/2016 | |

(Continued)

OTHER PUBLICATIONS

International Search Report dated Jun. 22, 2020 in corresponding application PCT/EP2020/061120.

(Continued)

*Primary Examiner* — Joseph L Williams
(74) *Attorney, Agent, or Firm* — Muncy, Geissler, Olds & Lowe, P.C.

(57) ABSTRACT

A lighting device for a vehicle, in particular a headlamp for a vehicle, having at least one light source, from which light emanates during the operation of the lighting device, a diffractive optical unit, including a plurality of gratings, which form a grating cell array, the light passing through the grating cell array during the operation of the lighting device in such a way that a light distribution is created in the outer area of the vehicle, at least one of the gratings of the grating cell array being designed as a volume hologram.

13 Claims, 2 Drawing Sheets

(56) References Cited

U.S. PATENT DOCUMENTS 11,009,203 B2    5/2021  Karthaus
2020/0156531 A1  5/2020  Kurashige et al.

FOREIGN PATENT DOCUMENTS

| DE | 102016106760 A1 | 10/2017 | | |
|---|---|---|---|---|
| DE | 102016107210 A1 | 10/2017 | | |
| DE | 102016117557 A1 | 3/2018 | | |
| DE | 102017108504 A1 | 10/2018 | | |
| DE | 102017118234 A1 | 2/2019 | | |
| EP | 3216650 A1 | 9/2017 | | |
| JP | 4099870 B2 * | 6/2008 | ............... | B60Q 1/34 |
| WO | WO2016087644 A1 | 6/2016 | | |
| WO | WO2017182311 A1 | 10/2017 | | |

OTHER PUBLICATIONS

Anonymous; "3D Printing Used to Creat Holographic Color Prints for Enhanced Security" Jan. 10, 2019.

* cited by examiner

LIGHTING DEVICE FOR A VEHICLE, AND METHOD FOR PRODUCING A LIGHTING DEVICE FOR A VEHICLE

This nonprovisional application is a continuation of International Application No. PCT/EP2020/061120, which was filed on Apr. 22, 2020, and which claims priority to German Patent Application No. 10 2019 111 647.3, which was filed in Germany on May 6, 2019, and which are both herein incorporated by reference.

BACKGROUND OF THE INVENTION

Field of the Invention

The present invention relates to a lighting device for a vehicle as well as a method for manufacturing a lighting device for a vehicle.

Description of the Background Art

A lighting device is known from DE 10 2016 106 760 A1, which is incorporated herein by reference. In the case of the lighting device described therein, a surface profiling is provided on a transparent substrate, which forms a grating cell array or a plurality of differently oriented diffraction gratings. The light emanating from a light source is diffracted by the grating cell array in such a way that a light distribution is created in the outer area of the vehicle.

It has proven to be disadvantageous that a multiplicity of diffraction orders is created in diffractive surface structures. The structures are furthermore very fine, so that the manufacture, in particular the introduction of corresponding structures into a tool, is very complex. Surface structures of this type are also sensitive to mechanical influences.

A lighting device for a vehicle and a method for manufacturing a lighting device of this type are known from DE 10 2016 107 210 A1, which is incorporated herein by reference. In the case of the method described therein, a hologram is imprinted into a light-sensitive recording material. An object beam and a reference beam are successively applied to individual sections of the recording material. The object beam is modulated by a light modulator, using computer-generated hologram information. The hologram, or a replica hologram manufactured as a master hologram with the aid of the hologram, may be integrated into a headlamp of a motor vehicle.

In the conventional art, however, it has proven to be disadvantageous that the calculation of the structures carried out, for example, with classic methods, such as the IFTA algorithm in the case of large holograms, may be extremely complex.

SUMMARY OF THE INVENTION

It is therefore an object of the present invention to provide a lighting device of the type mentioned at the outset, which may effectively generate a desired light distribution and/or may be more easily manufactured and/or is insensitive to mechanical influences. A method for manufacturing a lighting device of this type is furthermore to be specified.

According an exemplary embodiment, it is provided that at least one of the gratings of the grating cell array is designed as a volume hologram. Multiple or each of the gratings of the grating cell array is/are preferably designed as a volume hologram. Higher diffractive orders may be suppressed in a volume hologram. Moreover, no sensitive surface structures are present, and the calculation of the structures may be divided up, because the individual gratings of the grating cell array are independent of each other. This also simplifies the optimization of the gratings for special properties of the light source, such as the divergence thereof. It is also possible to implement a chromatic correction via a multiplexing. Different volume holograms or different grating cells may be imprinted at the same location for different spectral or angle ranges of the light. In the case of surface structures, in contrast, multiple boundary surfaces would have to be used as an aid.

It may be provided that the at least one volume hologram may be a computer-generated hologram.

It is possible that at least two of the gratings of the grating cell array can have different inclinations of their Bragg planes. The light emanating from the light source may therefore be divergent, in particular the inclinations of the Bragg planes of at least two gratings of the grating cell array being adapted to the divergence of the light of the light source. By adapting the inclination of the Bragg planes of multiple or all gratings of the grating cell array, the divergence of the light emanating from the light source may be taken into account.

Alternatively or additionally, it may be provided that the optical unit can have a curved surface, on which the grating cell array is mounted or into which the grating cell array is introduced, in particular the inclinations of the Bragg planes of at least two gratings of the grating cell array being adapted to the curvature of the surface. By adapting the inclination of the Bragg planes of multiple or all gratings of the grating cell array, the curvature of the space may also be taken into account, on which the grating cell array is mounted or into which the grating cell array is introduced.

It is possible that the optical unit includes at least one volume hologram used as a Fresnel lens. By providing at least one Fresnel lens, the optical unit may have further light-forming properties.

It may be provided that the light distribution generated by the lighting device in the outer area of the vehicle is a low-beam light distribution or a high-beam light distribution. Alternatively, the light distribution may also be a symbol projection, it being possible to increase the resolution of the symbol projection by increasing the number of gratings.

It is also provided that at least one of the gratings of the grating cell array is designed as a volume hologram.

It may be provided that the at least one grating designed as a volume hologram is introduced into a light-sensitive recording material by means of an exposure process. This may be done, for example, in that an object beam and a reference beam are overlapped on or in the light-sensitive recording material during the exposure process in order to imprint the at least one grating designed as a volume hologram into the source material. Alternatively, a master hologram may be exposed during the exposure process, the light emanating from the master hologram impinging on the source material in order to imprint the at least one grating designed as a volume hologram into the source material.

It is possible that the at least one grating designed as a volume hologram is introduced into a source material or applied to a source material by means of a nano 3D printing. This make take place, for example, by applying photoresist in layers, which is changed in its structure by means of light absorption. A volume hologram may be successively printed in this manner.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The example embodiments of a lighting device according to the invention comprise a light source, from which light emanates during the operation of the lighting device. The specific embodiments further comprise a diffractive optical unit 1, including a plurality of gratings 2, which form a grating cell array. Light 3 emanating from the light source passes through the grating cell array in such a way that a light distribution 4 is created in the outer area of the vehicle. In addition to gratings 2, diffractive optical unit 1 may also comprise Fresnel lenses.

Figure 1:
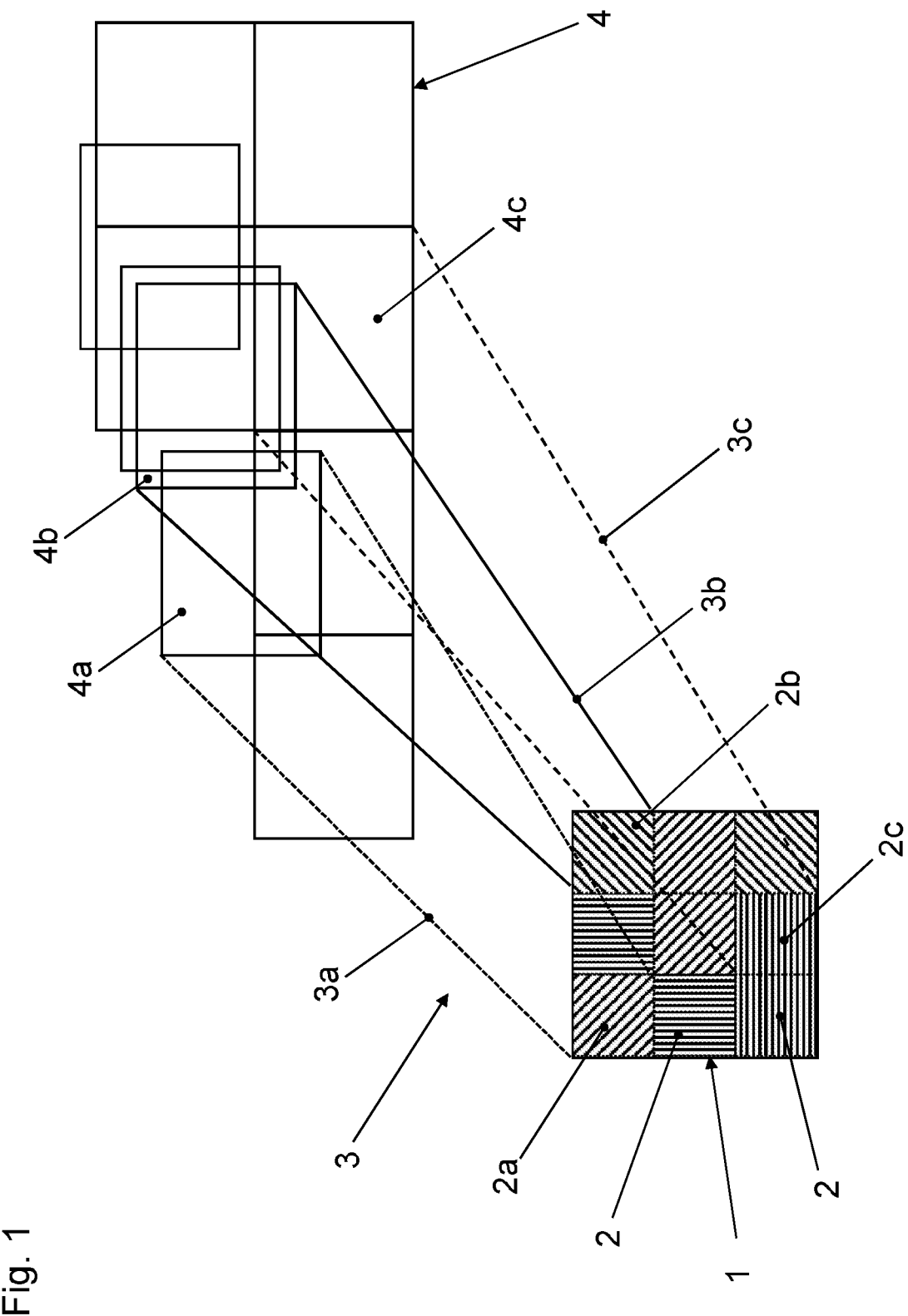
FIG. 1 shows a schematic view of a detail of an example embodiment of a lighting device according to the invention.

By illuminating the grating cell array, light packets are distributed in such a way that a low-beam light distribution, for example, is created in the target plane, as in the exemplary embodiment according to FIG. 1. For example, three partial light beams 3a, 3b, 3c are drawn in FIG. 1, which emanate from three gratings 2a, 2b, 2c. Parts 4a, 4b, 4c of light distribution 4 generated by the three partial light beams 3a, 3b, 3c are also indicated in FIG. 1.

Gratings 2 widen light 3 in such a way and deflect it in such a way that desired light distribution 4 is created by superimposing all local widened areas and deflections.

Figure 2:
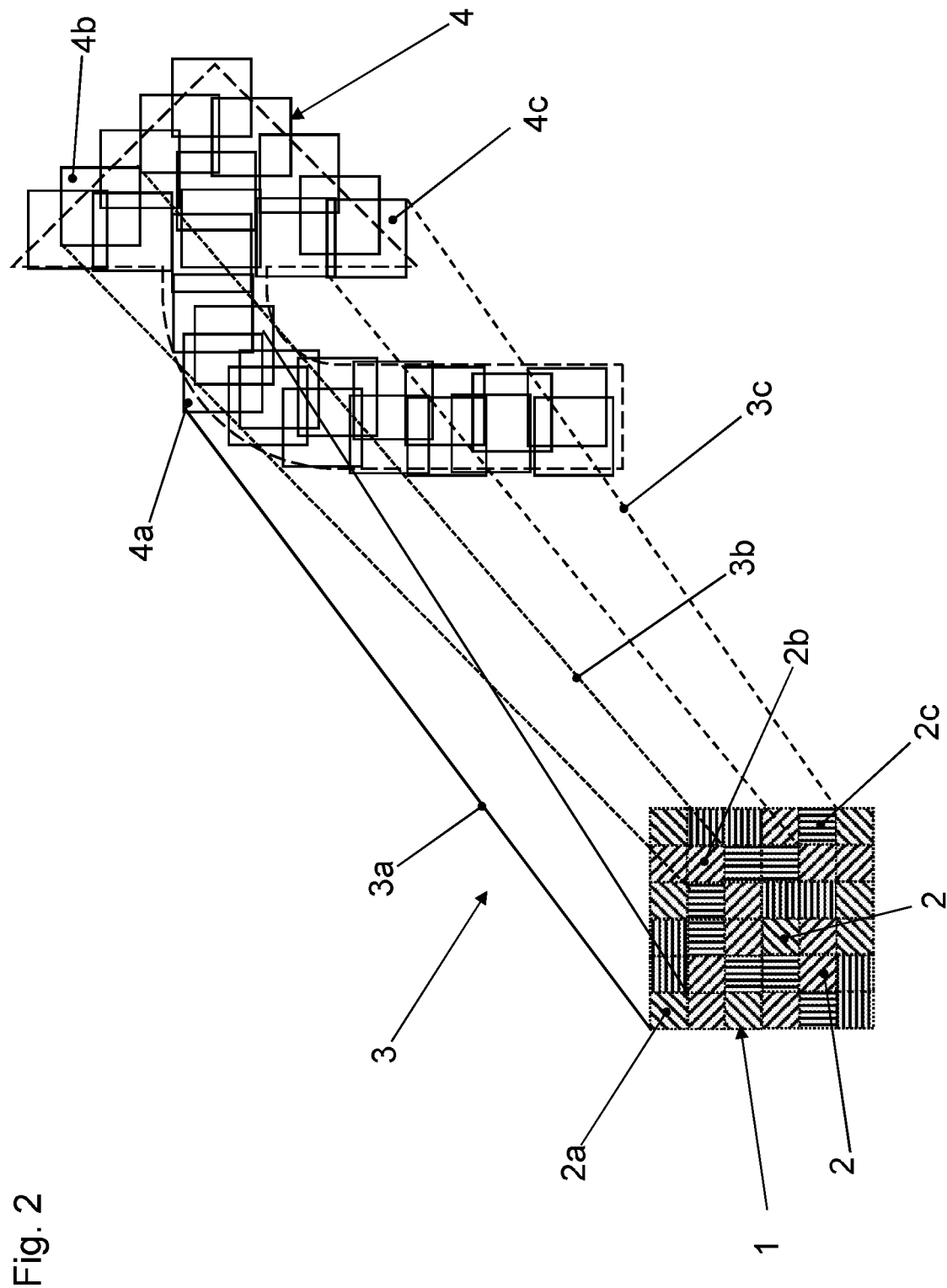
FIG. 2 shows a schematic view of a detail of an example embodiment of a lighting device according to the invention.

FIG. 2 shows another possible distribution for generating a symbol projection. A finer resolution of light distribution 4 may also be achieved by increasing the number of gratings 2 of the grating cell array.

Gratings 2 of the grating cell array are designed as volume holograms. The gratings and possibly the Fresnel lenses are introduced into the source material, for example by means of an exposure process or by nano 3D printing. In particular, the source material may be a light-sensitive photopolymer, into which the grating and possibly Fresnel lenses may be introduced by means of an exposure method, as in holography methods known from the prior art.

For example, an object beam and a reference beam may thus be overlapped on or in the light-sensitive recording material in order to imprint the gratings and possibly the Fresnel lenses into the source material. Alternatively, a master hologram may also be exposed, the light emanating from the master hologram impinging on the source material in order to imprint the gratings and possibly the Fresnel lenses into the source material.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed:

1. A lighting device for a vehicle, the lighting device comprising:
   a light source, from which light emanates during an operation of the lighting device; and
   a diffractive optical unit, including a plurality of gratings, which form a grating cell array, the light passes through the grating cell array during the operation of the lighting device such that a light distribution is created in an outer area of the vehicle,
   wherein at least one of the gratings of the grating cell array is a volume hologram,
   wherein the light emanating from the light source is divergent, wherein inclinations of Bragg planes of at least two of the gratings of the grating cell array are different from one another, and wherein the inclinations of the Bragg planes of the at least two of the gratings of the grating cell array are adapted to a divergence of the light emanating from the light source.

2. The lighting device according to claim 1, wherein at least two or each of the gratings of the grating cell array is/are designed as a volume hologram.

3. The lighting device according to claim 1, wherein the at least one of the gratings that is a volume hologram is a computer-generated hologram.

4. The lighting device according to claim 1, wherein the diffractive optical unit has a curved surface, on which the grating cell array is mounted or into which the grating cell array is introduced, and wherein the inclinations of the Bragg planes of at least two of the gratings of the grating cell array are adapted to a curvature of the curved surface.

5. The lighting device according to claim 1, wherein the diffractive optical unit includes at least one volume hologram used as a Fresnel lens.

6. The lighting device according to claim 1, wherein the light distribution generated by the lighting device in the outer area of the vehicle is a low-beam light distribution or a high-beam light distribution.

7. A method for manufacturing the lighting device for a vehicle according to claim 1, the method comprising:
   providing the diffractive optical unit having the plurality of gratings, which form the grating cell array; and
   forming the at least one of the gratings of the grating cell array as a volume hologram.

8. The method according to claim 7, wherein the volume hologram of the at least one of the gratings is introduced into a light-sensitive recording material by an exposure process.

9. The method according to claim 8, wherein an object beam and a reference beam are overlapped on or in the light-sensitive recording material during the exposure process in order to imprint the volume hologram into the light-sensitive recording material.

10. The method according to claim 8, wherein a master hologram is exposed during the exposure process, light emanating from the master hologram impinging on the light-sensitive recording material in order to imprint the volume hologram into the light-sensitive recording material.

11. The method according to claim 7, wherein the volume hologram of the at least one of the gratings is introduced into a light-sensitive recording material or applied to the light-sensitive recording material by a nano 3D printing.

12. The method according to claim 7, wherein the lighting device is a headlamp for the vehicle.

13. The lighting device according to claim 1, wherein the lighting device is a headlamp for a motor vehicle.

\* \* \* \* \*